2,517,717

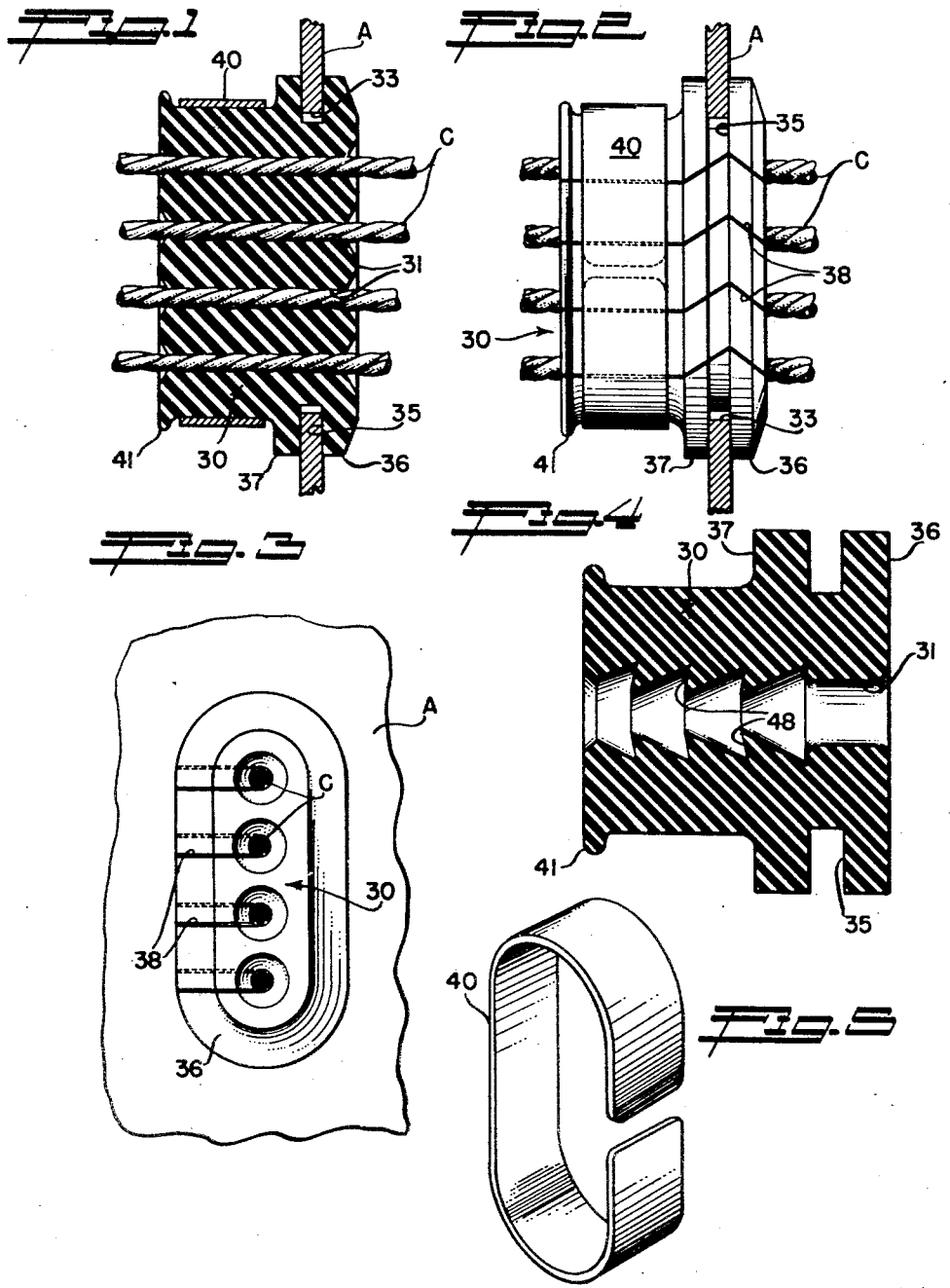
Aug. 8, 1950      B. A. ROSE      2,517,717
CABLE SEAL
Original Filed Nov. 3, 1945
INVENTOR.
BERNHARD A. ROSE
BY
Agent Patented Aug. 8, 1950

UNITED STATES PATENT OFFICE 2,517,717

CABLE SEAL

Bernhard A. Rose, North Hollywood, Calif., assignor to Lockheed Aircraft Corporation, Burbank, Calif.

Original application November 3, 1945, Serial No. 626,526. Divided and this application October 1, 1947, Serial No. 777,299

6 Claims. (Cl. 288—2)

This invention relates to sealing devices, and relates more particularly to devices for sealing about control cables and other movable control elements where they pass through pressure bulkheads, and the like. This application is a division of application, Serial No. 626,526, filed November 3, 1945.

In aircraft designed for high altitude flying it is now the common practice to pressurize the fuselage so that an internal air pressure condition may be maintained which is conducive to the comfort and well-being of the passengers and crew. The control systems of aircraft usually embody cables which extend from the interior of the fuselage or flight compartment to the control elements. These cables pass through openings in the pressure bulkhead, and means must be provided to prevent the escape of the cabin air pressure from around the cables. It is important that an effective seal be maintained at each cable under the widely varying temperature conditions encountered during high altitude flight. Furthermore, it is important that the frictional resistance to cable movement offered by the sealing devices be kept at a minimum under all conditions of operation and flight so that the pilot has a full sense of "feel" in operating the controls.

It is a general object of this invention to provide a cable seal useful at a pressure bulkhead, or the like, that reduces air leakage to a minimum and that has low frictional resistance to cable movement. The cable seal of this invention keeps the air pressure leakage at an acceptable minimum when initially installed, as well as after extended service and while under a considerable pressure differential. The frictional resistance of the device remains low at temperatures of between 160° F. and —65° F. The frictional resistance will usually be in the order of one-half pound per cable in average operation.

Another object of this invention is to provide a cable seal that is simple and compact, requiring a minimum of space at the bulkhead. The small compact sealing device of the invention does not interfere with the installation of pulleys in adjacent relation to the bulkhead or with the operation of cables over pulleys so positioned.

It is another object of the invention to provide cable seals that may be easily and quickly installed subsequent to rigging of the cables. The devices are in the nature of grommets cut or split to be readily engaged on previously rigged cables and then arranged in the openings of the pressure bulkhead. The cable admitting or passing slits are formed in the devices in such a manner that they are automatically closed against the leakage of air pressure when the devices are in the final installed positions.

A further object of the invention is to provide cable seals of the class mentioned which automatically adjust themselves to considerable amounts of angular and offset mis-alignment of the cable without undue air pressure leakage and without excessive wear.

Other objects and features of the invention will be readily understood from the following detailed description of a typical preferred form of the invention wherein reference will be made to the accompanying drawings in which:

Figure 1 is a longitudinally cross sectional view of the cable seal of the invention;

Figure 2 is a side elevation of the cable seal shown in Figure 1;

Figure 3 is an end view of the device;

Figure 4 is an enlarged transverse cross section of the seal body illustrating the sealing lips for engaging the cables; and Figure 5 is a perspective view of the band or clip embodied in the device.

The sealing devices of the present invention are capable of considerable variation to adapt them for specific installations. Furthermore, the devices may be constructed to seal about single cables or control elements or a plurality of such members. In the following detailed description I will describe a typical preferred form of the invention as employed to seal about conventional control cables, it being understood that the invention is not to be construed as limited or restricted to the particular details herein set forth.

The grommet sealing device is adapted to be installed on a bulkhead A to seal about the cable or cables C. The device may be said to comprise generally, a grommet-like body 30 and means in the body for sealing about the cable C.

The body 30 is a generally spool-shaped member of flexible resilient material. It is preferred to construct the body 30 of a synthetic rubber or rubber composition having a low thermal coefficient of expansion, and that retains its resiliency and flexibility throughout a wide range of temperatures. The body 30 is a one-piece member having one or more longitudinal openings 31 which are considerably larger in diameter than the cables C so that the cables may pass through them without interference. The body 30 is of sufficient length to extend through an opening 33 in the bulkhead A and then project some distance from the inner or "pressure" side of the bulkhead.

The body 30 is constructed so that it may be readily installed in the opening 33 of the bulkhead A to have limited play or movement therein. This freedom of movement allows the device to adjust itself to considerable misalignment of the cables C while maintaining effective sealing engagement with both the bulkhead and the cables. The portion of the body 30 that is engaged with the bulkhead A is enlarged in external diameter to have what may be considered a radial flange. An external annular groove 35 is formed in this flange and divides the enlarged or flanged portion into two annular lips 36 and 37. The groove 35 is of substantial depth and the inner or bottom wall of the groove has a diameter considerably smaller than the diameter of the bulkhead opening 33. The annular space or clearance thus provided between the bottom wall of the groove 35 and the wall of the opening 33 allows the device to shift with respect to the bulkhead in conformance with angularity and misalignment of the cables C. The side walls of the groove 35 are flat to engage the inner and outer surfaces of the bulkhead A, and the groove is proportioned so that these walls have sealing contact with the bulkhead surfaces.

In the drawings, I have illustrated a cable seal capable of sealing about a plurality of spaced cables C and the body 30 is transversely elongated as best illustrated in Figure 3. The body 30 is provided with a plurality of spaced openings 31 for receiving the cables C, the openings being parallel and in a common plane in the particular embodiment illustrated. The opening 33 in the bulkhead A is elongated to receive the body 30.

There is a longitudinally extending slot or cut 38 provided in the body 30 to extend inwardly from one face of the body to each cable receiving opening 31. The cuts 38 extend throughout the length of the body to permit the assembling of the device on the previously rigged cables C. As shown in Figure 2, the cuts 38 are straight and axial in the inner portion of the body 30 and are of chevron formation in the flange part of the body. The chevron shaped portions of the cuts 38 provide effective seals for preventing axial leakage of air pressure. Internal air pressure urges the inner lip 37 against the bulkhead A to preserve a seal at the bulkhead and urges the sides of the diagonal cut portions together to maintain air-tight seals at the cuts.

A metal clip 40, such as illustrated in Figure 5, is engaged on the body 30 to prevent the body from spreading or opening up, and to assist in maintaining the packing or sealing means in the operative condition, as will later become apparent. The clip 40 is adapted to substantially encircle the inner portion of the body 30, being in the form of a band having a circumference of slightly less than 360°. A peripheral bead 41 may be provided on the inner end of the body 30 and the clip is engaged on the body between the bead and the inner flange or lip 37. It is preferred to construct the band or clip 40 of metal having substantial resiliency. In applying the clip 40 it is spread so that it may be passed over the inner end of the body and is then released to spring inwardly or contract onto the body. The resilient band 40 exerts a suitable inward force or compression to prevent spreading of the body 30 and to hold the cuts 38 closed.

In accordance with this invention the rubber or rubber-like material of the body 30 directly seals with the cables C. In order to reduce the frictional resistance to cable movement to a minimum and to assure effective sealing engagement with the cables, the wall of each opening 31 has a series of sealing lips 48. The sealing lips 48 are spaced apart axially in their respective openings 31 and are annular to fully engage around the circumferences of the cables. The sealing ridges or lips 48 are preferably defined by convergent annular surfaces joining at sharp or feather edges. This configuration of the lips 48 allows them to conform to the individual lays and grooves of the cables C, and gives the lips increased flexibility and resiliency. The sealing lips 48 are proportioned so that they are pressed radially outward through their engagement with the cables C and the resiliency of the lips maintains them in effective sealing cooperation with the cables. It will be observed that the sealing lips 48 engage their respective cables at longitudinally spaced areas, and the provision of the lips materially reduces the areas of frictional contact between the cables and the body 30. Accordingly, effective pressure resistant seals are provided with a minimum of accompanying frictional resistance to cable movement.

From the above detailed description it is believed that it will be apparent how the cable seal may be easily and quickly assembled at the bulkhead A to maintain substantially air-tight seals around previously rigged cables. The device projects a minimum distance from the bulkhead A and occupies only a small area at the bulkhead so that it does not interfere with the installation or operation of adjacent pulleys. The air pressure at the inner side of the bulkhead A holds the lip 37 in sealing engagement with the bulkhead to prevent leakage around the exterior of the device. The sealing lips 48 maintain effective sealing contact with the cables C under varying pressure and temperature conditions. The sealing means offers a minimum of resistance to the movement of the cable and is long lived.

Having described only typical forms of the invention, I do not wish to be limited to the specific details herein set forth, but wish to reserve to myself any variations or modifications that may appear to those skilled in the art or fall within the scope of the following claims.

I claim:

1. Means for sealing between a cable or the like and an apertured plate through which the cable passes, comprising a body of resilient material having a flange portion at one end provided with an annular external groove adapted to receive the edge portion of the aperture in the plate, the cooperation of said edge portion and groove constituting the sole means for supporting the body on the plate, a reduced elongate neck portion extending from the flange portion to project from the plate, a bore extending through the flange and neck portions for receiving a cable, means in the neck portion for sealing with the cable, a slit in the body extending from the outer surface thereof to said bore for admitting the cable thereto, and a split resilient ring engaging around the body to hold the slit closed.

2. Means for sealing between a cable or the like and an apertured plate through which the cable passes, comprising a body of resilient material having an enlarged flange portion adjacent one end, said flange portion having an annular external groove therein adapted to receive the edge portion of the aperture in the plate to support the body on the plate, a reduced neck portion extending from the flange portion to project from a face of said plate, a bore extending through the flange and neck portions for receiving a cable, at least one elastic sealing lip on the wall of said bore for sealing with the cable, a slit in the body extending from the outer surface thereof to said bore for admitting the cable thereto, and a split resilient ring engaging around the neck portion of the body to hold the slit closed and to maintain the sealing lip in engagement with the cable.

3. Means for sealing between a cable or the like and an apertured plate through which the cable passes, comprising a body of resilient material having a flange portion with an annular external groove therein adapted to receive the edge portion of the aperture in the plate, a reduced neck portion, a bore extending through the flange and neck portions for receiving a cable, means in the neck portion for sealing with the cable, a slit in the body extending from the outer surface thereof to said bore for admitting the cable thereto, and a spring ring engaged on said neck portion of the body to hold the slit closed and to maintain said means in sealing contact with the cable.

4. Means for sealing between a cable or the like and an apertured plate through which the cable passes, comprising a body of resilient material having a head portion with an annular groove therein adapted to receive the edge of the aperture in the plate, a flexible neck portion, a bore through the head and neck portions, a sealing portion contiguous to the neck portion, said sealing portion having an annular cable-engaging bore of less diameter than said first bore, a slit in said body extending from the outer surface thereof to said bores, and a split ring surrounding said body and retaining said slit in closed position.

5. A device for sealing between a cable or the like and an apertured plate comprising a body of elastic material having a flange portion adjacent one end and a reduced neck portion extending from the flange portion, the flange portion having an external annular groove for receiving the edge portion of the aperture in the plate to support the body on the plate so that said neck portion projects outwardly beyond the plate, there being a bore extending axially through the flange and neck portions to receive a cable, sealing means in the neck portion for sealing about the cable, the body having a longitudinal slit extending from one end to the other and extending from the external surface of the body to said bore to admit the cable to the bore, the portion of the slit which passes through said flange portion having two convergent parts so as to be of chevron shape, and a split spring ring engaged around said neck portion to prevent the body from opening up at the slit.

6. A device between an apertured plate and a cable or the like which passes through an aperture in the plate, there being superatmospheric pressure at one side of the plate, the device comprising a body of elastic material having an enlarged flange portion adjacent one end and a reduced neck portion extending axially from the flange portion, said flange portion having a peripheral groove receiving an edge portion of said aperture to support the body on the plate in a position where the neck portion projects from pressure-side of the plate, the wall of the groove at said side of the plate being urged into sealing engagement with the plate by said pressure, the body having an axial opening extending through the body from one end to the other to receive a cable, means in said opening for sealing about the cable, the body having an axially extending slit extending from the outer surface thereof to said opening to admit the cable to the opening, the part of the slit which passes through the flange portion being of chevron shape so that said pressure acting on the flange urges walls of said part of the slit together, and a clip engaged around the neck portion of the body to hold the slit closed.

BERNHARD A. ROSE.

REFERENCES CITED

The following references are of record in the file of this patent:

UNITED STATES PATENTS

| Number | Name | Date |
| --- | --- | --- |
| 394,156 | Crandall | Dec. 11, 1888 |
| 1,287,285 | Gammeter | Dec. 10, 1918 |
| 1,336,030 | Gammeter | Apr. 6, 1920 |
| 1,697,814 | Forbes | Jan. 1, 1929 |
| 1,747,592 | Morlang | Feb. 18, 1930 |
| 1,800,578 | Webb | Apr. 14, 1931 |
| 1,801,995 | Bell | Apr. 21, 1931 |
| 1,875,936 | Saunders | Sept. 6, 1932 |
| 2,039,009 | Lampman et al. | Apr. 28, 1936 |